(12) United States Patent
Sato et al.

(10) Patent No.: US 7,793,977 B2
(45) Date of Patent: Sep. 14, 2010

(54) SIDE AIRBAG APPARATUS

(75) Inventors: Yuji Sato, Aichi-ken (JP); Toshinori Tanase, Aichi-ken (JP); Hiroshi Kato, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 176 days.

(21) Appl. No.: 11/797,093

(22) Filed: Apr. 30, 2007

(65) Prior Publication Data

US 2007/0278771 A1 Dec. 6, 2007

(30) Foreign Application Priority Data

Jun. 1, 2006 (JP) .............................. 2006-153811

(51) Int. Cl.
*B60R 21/16* (2006.01)
*B60R 21/207* (2006.01)
(52) U.S. Cl. ................................ 280/743.2; 280/730.2
(58) Field of Classification Search .............. 280/730.2, 280/743.2
See application file for complete search history.

(56) References Cited

U.S. PATENT DOCUMENTS

| | | | | |
|---|---|---|---|---|
| 5,306,043 A | * | 4/1994 | Mihm et al. ................. | 280/732 |
| 5,513,877 A | * | 5/1996 | MacBrien et al. ........... | 280/732 |
| 5,647,609 A | * | 7/1997 | Spencer et al. ............ | 280/730.2 |
| 5,676,395 A | * | 10/1997 | Oe et al. .................... | 280/730.2 |
| 5,683,109 A | * | 11/1997 | Birman ..................... | 280/743.2 |
| 5,845,966 A | * | 12/1998 | Severinski et al. ..... | 297/216.13 |
| 5,848,804 A | * | 12/1998 | White et al. ............. | 280/743.1 |
| 6,059,311 A | * | 5/2000 | Wipasuramonton et al. . | 280/729 |
| 6,086,091 A | * | 7/2000 | Heinz et al. ............... | 280/728.3 |
| 6,142,507 A | * | 11/2000 | Okuda et al. ............. | 280/730.2 |
| 6,155,595 A | * | 12/2000 | Schultz ....................... | 280/729 |
| 6,206,411 B1 | * | 3/2001 | Sunabashiri ............. | 280/730.2 |
| 6,231,070 B1 | * | 5/2001 | Sunabashiri et al. ..... | 280/730.2 |
| 6,254,130 B1 | * | 7/2001 | Jayaraman et al. ....... | 280/743.2 |
| 6,318,753 B1 | * | 11/2001 | Valkenburg .............. | 280/730.2 |
| 6,361,072 B1 | * | 3/2002 | Barnes .................... | 280/743.1 |
| 6,422,593 B1 | * | 7/2002 | Ryan ....................... | 280/730.2 |
| 6,450,529 B1 | * | 9/2002 | Kalandek et al. ......... | 280/730.2 |
| 6,511,093 B2 | * | 1/2003 | Buerkle et al. ............. | 280/729 |
| 6,561,539 B1 | * | 5/2003 | Sunabashiri et al. ..... | 280/730.1 |
| 6,616,184 B2 | * | 9/2003 | Fischer .................... | 280/743.2 |

(Continued)

FOREIGN PATENT DOCUMENTS

JP 2006-035988 2/2006

*Primary Examiner*—Paul N. Dickson
*Assistant Examiner*—Barry Gooden, Jr.
(74) *Attorney, Agent, or Firm*—Posz Law Group, PLC

(57) ABSTRACT

A side airbag apparatus includes an inflator and an airbag. Gas discharged from the inflator inflates and deploys the airbag in a space between a vehicle door and an occupant seated on a front seat in a passenger compartment. The airbag has a tether that limits the thickness of the airbag when the airbag is inflated and deployed. The airbag has a pair of inner surfaces that face each other along the direction of the thickness. The tether bridges the inner surfaces of the airbag. A vehicle exterior joint portion, which couples the tether to the inner surface of the airbag located close to an inner surface of the body side portion, is located closer to a center of the airbag than a vehicle interior joint portion, which couples the tether to the inner surface of the airbag located far from the inner surface of the body side portion.

14 Claims, 2 Drawing Sheets

U.S. PATENT DOCUMENTS

| | | | |
|---|---|---|---|
| 6,679,522 B2* | 1/2004 | Igawa | 280/743.1 |
| 7,198,290 B2* | 4/2007 | Yamada et al. | 280/731 |
| 7,222,877 B2* | 5/2007 | Wipasuramonton et al. | 280/730.1 |
| 7,293,799 B2* | 11/2007 | Fellhauer et al. | 280/743.2 |
| 7,328,915 B2* | 2/2008 | Smith et al. | 280/739 |
| 7,360,789 B2* | 4/2008 | Bito | 280/743.1 |
| 7,360,791 B2* | 4/2008 | Yamada | 280/743.2 |
| 7,393,011 B2* | 7/2008 | Keshavaraj | 280/743.2 |
| 7,396,042 B2* | 7/2008 | Mabuchi et al. | 280/730.2 |
| 7,434,837 B2* | 10/2008 | Hotta et al. | 280/743.2 |
| 7,461,862 B2* | 12/2008 | Hasebe et al. | 280/743.2 |
| 2002/0096871 A1* | 7/2002 | Pinsenschaum et al. | 280/743.2 |
| 2002/0158456 A1* | 10/2002 | Fischer | 280/743.2 |
| 2004/0183286 A1* | 9/2004 | Kino | 280/730.2 |
| 2005/0082807 A1* | 4/2005 | Kwon | 280/743.2 |
| 2005/0127643 A1* | 6/2005 | Abe et al. | 280/730.1 |
| 2005/0127653 A1* | 6/2005 | Williams et al. | 280/743.2 |
| 2005/0212276 A1* | 9/2005 | Yamada | 280/743.2 |
| 2005/0218635 A1* | 10/2005 | Wipasuramonton et al. | 280/730.2 |
| 2005/0236823 A1* | 10/2005 | Schuetz | 280/743.2 |
| 2006/0038386 A1* | 2/2006 | Shibayama et al. | 280/730.2 |
| 2006/0043707 A1* | 3/2006 | Hasebe et al. | 280/730.2 |
| 2006/0113771 A1* | 6/2006 | Tracht | 280/730.2 |
| 2006/0131847 A1* | 6/2006 | Sato et al. | 280/730.2 |
| 2006/0163850 A1* | 7/2006 | Inazu et al. | 280/730.2 |
| 2006/0175812 A1* | 8/2006 | Abramczyk et al. | 280/730.2 |
| 2006/0232049 A1* | 10/2006 | Abe | 280/729 |
| 2006/0232054 A1* | 10/2006 | Schlosser et al. | 280/743.2 |
| 2006/0237956 A1* | 10/2006 | Fellhauer et al. | 280/740 |
| 2006/0267317 A1* | 11/2006 | Ida et al. | 280/730.2 |
| 2007/0126218 A1* | 6/2007 | Schnieder et al. | 280/739 |

\* cited by examiner

SIDE AIRBAG APPARATUS

BACKGROUND OF THE INVENTION

The present invention relates to a side airbag apparatus that is deployed and inflated at a side of an occupant of a vehicle.

When an impact that is equal to or greater than a predetermined value is applied to a body side portion of a vehicle, a typical side airbag apparatus inflates and deploys an airbag at a side of an occupant to reduce the impact applied to the occupant, thereby protecting the head, thorax, or lumbar region of the occupant. To instantly inflate and deploy the airbag, a gas generator of a side airbag apparatus discharges high pressure gas into the interior of the airbag.

Side airbag apparatuses are required not only to simply inflate and deploy an airbag, but also, to inflate and deploy an airbag in a desired state or in a desired position. Therefore, not only for instantly inflating and deploying an airbag, but also for inflating and deploying airbag in a desired state or in a desired position, it is important to control the behavior of the airbag when being inflated and deployed.

For example, Japanese Laid-Open Patent Publication No. 2006-35988 discloses a side airbag apparatus desired for controlling the behavior of an airbag when being inflated and deployed. The side airbag apparatus disclosed in the document has a belt for preventing an airbag from being inflated and deployed at a position displaced from a desired position due to forward inclination of the airbag. That is, the belt of the side airbag apparatus of the document pulls the airbag rearward with respect to the occupant, thereby guiding the airbag to the desired position. In this manner, the side airbag apparatus controls the behavior of the airbag when being inflated and deployed.

However, in the case of the side airbag apparatus disclosed in the document, the inflated and deployed airbag can be inclined inward of the vehicle, or toward an occupant, depending on the shape of the door trim that forms the body side portion of the vehicle. In such a case, the degree of inward inclination of the airbag may be predicted, and the height of the airbag may be increased in accordance with the predicted inclination, so that the head of an occupant is protected. However, according to this configuration, if the airbag is inflated and deployed upright instead of being inwardly inclined, the airbag is likely to hit the roof of the vehicle.

SUMMARY OF THE INVENTION

Accordingly, it is an objective of the present invention to provide a side airbag apparatus that prevents an inflated and deployed airbag from inclining inward of a vehicle, thereby reliably protecting an occupant.

To achieve the foregoing objectives, and in accordance with one aspect of the present invention, a side airbag apparatus having an airbag is provided, in which the airbag is inflated and deployed in a space between a body side portion of a vehicle and an occupant seated on a seat located in a passenger compartment by the pressure of gas discharged from a gas generator. The airbag has a thickness along the width of the vehicle when inflated and deployed. The airbag has a tether that limits the thickness of the airbag when the airbag is inflated and deployed. The airbag has a pair of inner surfaces that face each other along the direction of the thickness of the airbag. The tether bridges the inner surfaces of the airbag. A vehicle exterior joint portion, which couples the tether to the inner surface of the airbag located close to an inner surface of the body side portion, is located closer to a center of the airbag than a vehicle interior joint portion, which couples the tether to the inner surface of the airbag located far from the inner surface of the body side portion.

DETAILED DESCRIPTION OF THE PREFERRED EMBODIMENTS

One embodiment of the present invention will now be described with reference to the drawings. In the description, the traveling direction of the vehicle is referred to as a forward direction. Also, up-down direction and left-right direction are defined with reference to the traveling direction of the vehicle, which is defined as the forward direction.

Figure 1:
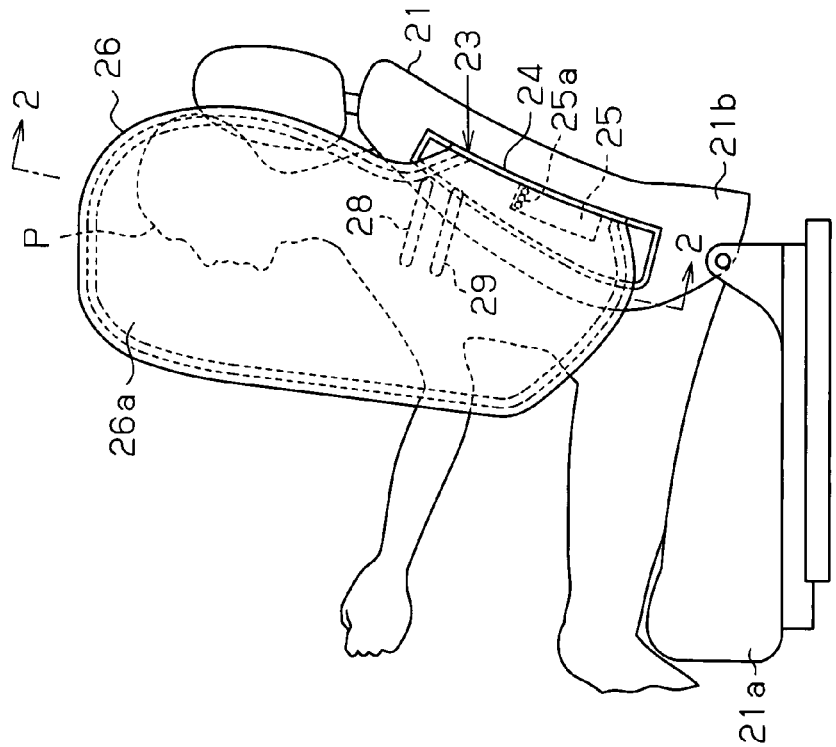
FIG. 1 is a side view illustrating an airbag according to one embodiment in an inflated and deployed state.

FIG. 1 shows a left front seat 21 (driver's seat) located in a passenger compartment. The front seat 21 is located on the floor of the passenger compartment, and includes a seat portion 21a and a backrest 21b. A case 24 for accommodating a side airbag apparatus 23 is provided on a left side of the backrest 21b. While being accommodated in the case 24, the side airbag apparatus 23 is located inside the backrest 21b so as to face a door 22 (see FIG. 3) that form a part of a body side portion of the vehicle. Although only the left front seat 21 is illustrated in FIG. 1, a right front seat has a similar airbag apparatus 23 in its right side portion.

The side airbag apparatus 23 has a columnar inflator 25 functioning as a gas generator and an airbag 26 covering the inflator 25. The airbag 26 is, together with the inflator 25, is fixed to the case 24 with bolts (not shown) with a rear lower portion of the airbag 26 held between the inflator 25 and the case 24. The inflator 25 accommodates a gas generating agent (not shown). The inflator 25 has gas outlets 25a at the top end for discharging gas generated by the gas generating agent. The inflator 25 is connected to a sensor (not shown) that detects impact applied to the body side portion.

Figure 2:
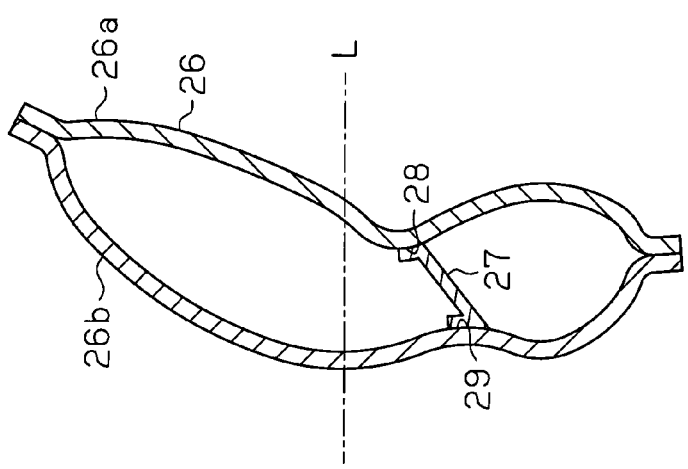
FIG. 2 is a cross-sectional view taken along line 2-2 of FIG. 1.

As shown in FIGS. 1 and 2, the airbag 26 has two fabric sheets 26a and 26b made of woven cloth. The fabric sheets 26a, 26b are sewn together at the periphery to form the airbag 26. When the airbag 26 is inflated and deployed, the fabric sheet 26a is located at the left side, or close to the inner surface of the body side portion, and the fabric sheet 26b is located at the right side, or far from the inner surface of the body side portion. Normally, the airbag 26 is accommodated in the case 24 in a folded state. The airbag 26 has a belt-like tether 27, which is to the fabric sheets 26a, 26b and bridged between the inner surfaces of the fabric sheets 26a, 26b. The tether 27 extends along the left-right direction, or along the thickness of the airbag 26. The tether 27 is located at a position that is below the center of the airbag 26 and close to the rear end of the airbag 26. The inflator 25 is located in the airbag 26 at a position below the tether 27. The center of the airbag 26 with respect to the up-down direction is indicated by dashed line L in FIG. 2.

In the present embodiment, the joint between the left end of the tether 27 and the inner surface of the fabric sheet 26a is defined as a vehicle exterior joint portion 28, which is located on the exterior side of the vehicle. The joint between the right end of the tether 27 and the inner surface of the fabric sheet 26b is defined as a vehicle interior joint portion 29, which is located closer to the lateral center of the vehicle. The joint portions 28, 29 are below a center line L. The tether 27 is inclined such that the vehicle exterior joint portion 28 is closer to the center line L than the vehicle interior joint portion 29 is to the center line L. That is, when viewed from the front of the vehicle, the tether 27 is inclined such that the tether 27 is raised from the interior side toward the exterior side of the vehicle. In this case, the circumferential length of the airbag 26 from the vehicle exterior joint portion 28 to the vehicle interior joint portion 29 via the upper end of the airbag 26 is longer than the circumferential length of the airbag 26 from the vehicle exterior joint portion 28 to the vehicle interior joint portion 29 via the lower end of the airbag 26.

Figure 3:
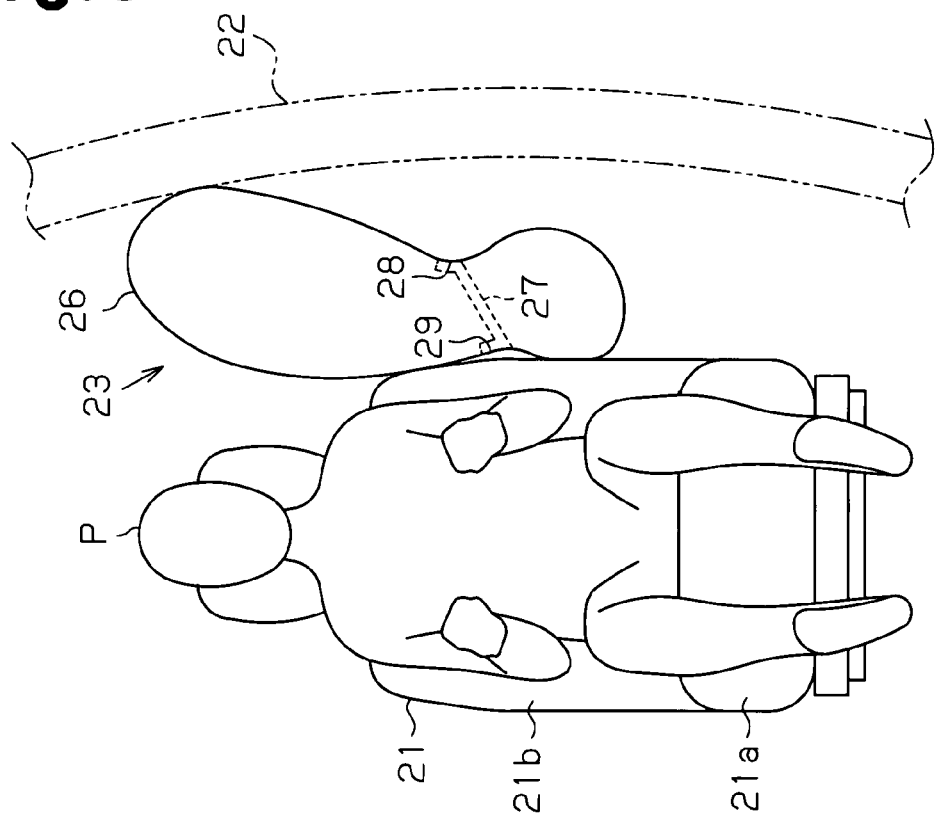
FIG. 3 is a front view illustrating the airbag in the inflated and deployed state.

The airbag 26 is inflated and deployed between an occupant P seated on the front seat 21 and the door 22 in such a manner as to correspond to the thorax and head of the occupant P (see FIG. 3). In this case, a part below the tether 27 is inflated and deployed at a position that corresponds to the lumbar regions of the occupant P, and a part above the tether 27 is inflated and deployed at a position that corresponds to the head of the occupant P.

The operation of the side airbag apparatus 23 will now be described wither reference to FIGS. 1 to 3.

When another vehicle collides with the door 22, which is a body side portion of the vehicle, and an impact equal to or greater than a predetermined value is applied, a control circuit (not shown) outputs drive current to the inflator 25 based on a detection signal from the sensor. The drive current heats the inflator 25 so that gas is generated from the gas generating agent in the inflator 25, and the gas is discharged from the gas outlets 25a into the airbag 26. However, in the airbag 26, the tether 27 limits the flow of gas to a portion above the tether 27. Therefore, after being injected to the airbag 26, the gas mainly flows to a portion below the tether 27. Thus, in the initial stage of the inflation and deployment of the airbag 26, the portion below the tether 27 is inflated and deployed. Thereafter, a great amount of gas flows to the portion above the tether 27, so that, in a later stage of the inflation and deployment of the airbag 26, the portion above the tether 27 is inflated and deployed.

When the airbag 26 is inflated and deployed, the expansion of the airbag 26 is greater toward the center line L. The thickness of the airbag 26 in the inflated and deployed state is limited by the tether 27. At this time, the tether 27 pulls the vehicle exterior joint portion 28 inward by a force greater than a force by which the tether 27 pulls the vehicle interior joint portion 29 inward. As a result, when the airbag 26 is inflated and deployed, the vehicle exterior joint portion 28, which is relatively close to the center line L, is constricted further inward than the vehicle interior joint portion 29, which is relatively far from the center line L. Therefore, the airbag 26 is inflated and deployed along the body side portion of the vehicle (the door 22) with the portion above the tether 27 being inclined toward the exterior of the vehicle. At this time, although the airbag 26 tends to be inclined toward the exterior of the vehicle, the airbag 26 contacts the inner surface of the door 22. Thus, the airbag 26 is inflated and deployed substantially upright along the inner surface of the door 22. That is, when the airbag 26 is inflated and deployed, the airbag 26 is prevented from being inclined toward the interior of the vehicle. Thus, the airbag 26 is expanded to have a desired height in the passenger compartment without increasing the vertical length of the airbag 26 more than necessary. Therefore, the airbag 26 creates a region in which the head of the occupant P is protected. The occupant P is thus reliably protected.

The above described present embodiment has the following advantages.

(1) When the airbag 26 is inflated and deployed, the expansion of the airbag 26 is greater toward the center line L, that is, toward the center of the airbag 26. In the present embodiment, since the vehicle exterior joint portion 28 is closer to the center line L than the vehicle interior joint portion 29, the tether 27 pulls the vehicle exterior joint portion 28 inward by a force greater than a force by which the tether pulls 27 pulls the vehicle interior joint portion 29 inward. Accordingly, the airbag 26 is constricted inward by a greater degree at the vehicle exterior joint portion 28 than at the vehicle interior joint portion 29. Therefore, the airbag 26 is inflated and deployed along the door 22 with the portion above the tether 27 being inclined toward the outside of the vehicle. That is, when the airbag 26 is inflated and deployed, the airbag 26 is prevented from being inclined toward the interior of the vehicle. Thus, the airbag 26 has a desired height in the passenger compartment. Therefore, the airbag 26 creates a region in which the head of the occupant P is protected. The occupant P is thus reliably protected.

(2) The circumferential length of the airbag 26 from the vehicle exterior joint portion 28 to the vehicle interior joint portion 29 via the upper end of the airbag 26 is longer than the circumferential length of the airbag 26 from the vehicle exterior joint portion 28 to the vehicle interior joint portion 29 via the lower end of the airbag 26. That is, the joint portions 28, 29 are below a center line L. Accordingly, when inflated and deployed, the airbag 26 is constricted inward by a greater degree at the vehicle exterior joint portion 28 than at the vehicle interior joint portion 29. This permits the portion of the airbag 26 that is located above the tether 27, which connects the joint portions 28, 29, to be greatly inclined toward the outside of the vehicle. This enlarges a region in which the airbag 26 is inclined toward the outside of the vehicle when the airbag 26 is inflated and deployed.

(3) The inflator 25 is located in the airbag 26 at a position below the tether 27. The tether 27 prevents gas discharged from the inflator 25 from directly flowing to the upper portion of the airbag 26. The gas discharged by the inflator 25 first inflates and deploys the portion of the airbag 26 below the tether 27, and then inflates and deploys the portion above the tether 27. This stabilizes the behavior of the airbag 26 when being inflated and deployed.

(4) The airbag 26 is inflated and deployed to correspond to a part of the body of the occupant P ranging from the thorax to the head. The airbag 26 thus reliably protects a part of the body of the occupant P ranging from the thorax to the head.

The above illustrated embodiment may be modified as follows.

Figure 4:
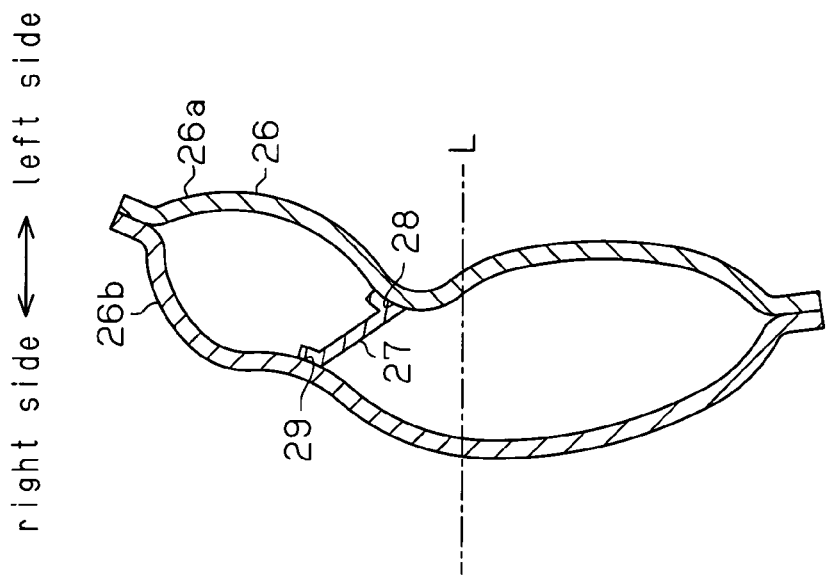
FIG. 4 is a cross-sectional view illustrating an airbag according to a modified embodiment.

As shown in FIG. 4, the tether 27 may be located above the center line L of the airbag 26, or above the center of the airbag 26. In this case, the tether 27 is inclined in the opposite orientation to the orientation of the inclination in the embodiment of FIGS. 1 to 3, such that the vehicle exterior joint portion 28 is closer to center line L that the vehicle interior joint portion 29 is to center line L.

As long as the vehicle exterior joint portion 28 is closer to the center line L than the vehicle interior joint portion 29, the tether 27 may intersect the center line L. That is, the vehicle exterior joint portion 28 and the vehicle interior joint portion 29 may be arranged to face each other along an oblique line intersecting the center line L.

The inflator 25 may be located in the airbag 26 at a position above the tether 27.

The side airbag apparatus 23 may be mounted in a vehicle rear seat.

The side airbag apparatus 23 may be configured such that the airbag 26 is inflated and deployed to correspond to a part of the body of the occupant P ranging from the thorax to the lumbar regions.

The invention claimed is:

1. A side airbag apparatus comprising an airbag that is inflated and deployed in a space between a body side portion of a vehicle and an occupant seated on a seat located in a passenger compartment by the pressure of gas discharged from a gas generator, in which prior to being deployed the airbag apparatus is accommodated in the seat with the airbag being folded,
the airbag having a thickness along the width of the vehicle when inflated and deployed,
the airbag having a tether that limits the thickness of the airbag when the airbag is inflated and deployed,
the airbag having a pair of inner surfaces that face each other along the direction of the thickness of the airbag, and
the tether bridging the inner surfaces of the airbag,
wherein a vehicle exterior joint portion, which couples the tether to the inner surface of the airbag located close to an inner surface of the body side portion, is located closer to a center of the airbag than a vehicle interior joint portion, which couples the tether to the inner surface of the airbag located far from the inner surface of the body side portion, the center of the airbag being determined with respect to an up-down direction of the airbag,
wherein, when the inflated airbag is viewed from the front, a cross-sectional area of an upper portion of the airbag located above the tether from a top of the airbag to the tether, is larger than the cross-sectional area of a lower portion of the airbag below the tether from the tether to a bottom of the airbag,
wherein, when inflated and deployed, the airbag includes a part below the tether and a part above the tether, the tether being tensioned in such a manner that the vehicle exterior joint portion is located above the vehicle interior joint portion, the part above the tether being inclined toward the body side portion of the vehicle.

2. The side airbag apparatus according to claim 1, wherein a circumferential length of the airbag from the vehicle exterior joint portion to the vehicle interior joint portion via an upper end of the airbag is longer than a circumferential length of the airbag from the vehicle exterior joint portion to the vehicle interior joint portion via a lower end of the airbag.

3. The side airbag apparatus according to claim 1, wherein the vehicle exterior joint portion and the vehicle interior joint portion are located below the center of the airbag.

4. The side airbag apparatus according to claim 1, wherein the gas generator is located in the airbag at a position below the tether.

5. The side airbag apparatus according to claim 1, wherein the airbag is inflated and deployed to correspond to a part of the body of the occupant ranging from the thorax to the head.

6. The side airbag apparatus according to claim 5, wherein the airbag is inflated and deployed substantially upright along the body side portion.

7. The side airbag apparatus according to claim 6, wherein, when inflated and deployed, the airbag is constricted by a greater degree at the vehicle exterior joint portion than at the vehicle interior joint portion.

8. The side airbag apparatus according to claim 1, the seat having a seat portion and a backrest, and the side airbag apparatus being located inside the backrest.

9. The side airbag apparatus according to claim 1, the vehicle exterior joint portion and the vehicle interior joint portion being located at a position below the center of the airbag and close to a rear end of the airbag.

10. The side airbag apparatus according to claim 1, when inflated and deployed, the part below the tether is at a position corresponding to a lumbar region of the occupant, and the part above the tether is at a position corresponding to a head of the occupant, the part above the tether being inclined from the tether upward toward the body side portion of the vehicle.

11. The side airbag apparatus according to claim 1, the tether having a belt-shape being longer in a left-right direction along the thickness of the airbag than in a front-back direction of the vehicle.

12. The side airbag apparatus according to claim 1, the tether being inclined such that when viewed from a front of the vehicle, the tether is raised from front-back center of the vehicle toward the body side portion of the vehicle.

13. A side airbag apparatus comprising an airbag that is inflated and deployed in a space between a body side portion of a vehicle and an occupant seated on a seat located in a passenger compartment by the pressure of gas discharged from a gas generator, in which prior to being deployed the airbag apparatus is accommodated in the seat with the airbag being folded,
the airbag having a thickness along the width of the vehicle when inflated and deployed,
the airbag having a belt-shaped tether that limits the thickness of the airbag when the airbag is inflated and deployed, the tether being longer in a left-right direction along the thickness of the airbag than in a front-back direction of the vehicle,
the airbag having a pair of inner surfaces that face each other along the direction of the thickness of the airbag, and
the tether bridging the inner surfaces of the airbag,
wherein a vehicle exterior joint portion, which couples the tether to the inner surface of the airbag located close to an inner surface of the body side portion, is located closer to a center of the airbag than a vehicle interior joint portion, which couples the tether to the inner surface of the airbag located far from the inner surface of the body side portion, the vehicle exterior joint portion and the vehicle interior joint portion being located at a position below the center of the airbag and close to a rear end of the airbag, the center of the airbag being determined with respect to an up-down direction of the airbag,
wherein, when the inflated airbag is viewed from the front, a cross-sectional area of an upper portion of the airbag located above the tether from a top of the airbag to the tether, is larger than the cross-sectional area of a lower portion of the airbag below the tether from the tether to a bottom of the airbag,
wherein a circumferential length of the airbag from the vehicle exterior joint portion to the vehicle interior joint portion via an upper end of the airbag is longer than a circumferential length of the airbag from the vehicle exterior joint portion to the vehicle interior joint portion via a lower end of the airbag,
wherein the vehicle exterior joint portion and the vehicle interior joint portion are located below the center of the airbag,
wherein the gas generator is located in the airbag at a position below the tether, wherein the airbag is inflated and deployed to correspond to a part of the body of the occupant ranging from the thorax to the head, wherein the airbag is inflated and deployed substantially upright along the body side portion, wherein, when inflated and deployed, the airbag is constricted by a greater degree at the vehicle exterior joint portion than at the vehicle interior joint portion, wherein, when inflated and deployed, the airbag includes a part below the tether at a position corresponding to a lumbar region of the occupant, and a part above the tether at a position corresponding to a head of the occupant, the tether being tensioned in such a manner that the vehicle exterior joint portion is located above the vehicle interior joint portion, thereby the part above the tether being inclined from the tether upward toward the body side portion of the vehicle.

14. The side airbag apparatus according to claim 13, the tether being inclined such that when viewed from a front of the vehicle, the tether is raised from a front-back center of the vehicle toward the exterior side of the vehicle.

* * * * *